US011977399B2

(12) United States Patent
Maly, Jr. et al.

(10) Patent No.: US 11,977,399 B2
(45) Date of Patent: May 7, 2024

(54) FLUID PRESSURE MONITORING SYSTEM USING FLOW DATA

(71) Applicant: ROMET LIMITED, Mississauga (CA)

(72) Inventors: Frederick Joseph Maly, Jr., Oakville, MO (US); Brent Collver, Oakville (CA); Mohammadreza Soudmand-Asli, Toronto (CA)

(73) Assignee: ROMET LIMITED, Mississauga (CA)

( * ) Notice: Subject to any disclaimer, the term of this patent is extended or adjusted under 35 U.S.C. 154(b) by 56 days.

(21) Appl. No.: 17/703,820

(22) Filed: Mar. 24, 2022

(65) Prior Publication Data
US 2022/0308602 A1 Sep. 29, 2022

Related U.S. Application Data

(60) Provisional application No. 63/165,880, filed on Mar. 25, 2021.

(51) Int. Cl.
G05D 7/06 (2006.01)
G01F 1/36 (2006.01)
G01F 1/684 (2006.01)
G01F 25/10 (2022.01)

(52) U.S. Cl.
CPC ........... *G05D 7/0623* (2013.01); *G01F 1/363* (2013.01); *G01F 1/6842* (2013.01); *G01F 25/10* (2022.01)

(58) Field of Classification Search
CPC ..... G05D 7/0623; G01F 1/363; G01F 1/6842; G01F 25/10
See application file for complete search history.

(56) References Cited

U.S. PATENT DOCUMENTS

| 6,178,997 B1 | 1/2001 | Adams et al. |
| 6,441,744 B1 | 6/2002 | Adams et al. |
| 6,725,167 B2 | 4/2004 | Grumstrup et al. |
| 7,945,414 B2 | 5/2011 | Nagase et al. |
| 8,479,566 B2 | 7/2013 | Haseloh et al. |
| 8,639,464 B2 | 1/2014 | Artiuch et al. |
| 9,494,947 B2 | 11/2016 | Hirata et al. |

(Continued)

FOREIGN PATENT DOCUMENTS

| CA | 2513861 C | 9/2004 |
| CN | 206930009 U * | 1/2018 |

(Continued)

OTHER PUBLICATIONS

Fisher 4320 Wireless Position Monitor, Instruction Manuel; Nov. 2020; 64 pages.

*Primary Examiner* — Ryan D Walsh

(57) ABSTRACT

A fluid monitoring system is provided, which includes a control unit and at least one fluid pressure recorder. The recorder is configured for direct connection to a pipeline portion of a system to be monitored and includes upstream and downstream pressure sensors. The control unit is configured to detect, and provide for display or trigger an action, in the event that a new downstream pressure is more than a threshold number of standard deviations above or below a mean downstream pressure determined from prior readings of the downstream pressure—even though neither the minimum nor maximum pressure of the pipeline portion is reached. A fluid monitoring system for a regulator on a pipeline system is also provided.

24 Claims, 6 Drawing Sheets

(56) References Cited

U.S. PATENT DOCUMENTS

| | | | |
|---|---|---|---|
| 9,995,486 B2* | 6/2018 | Young | G05D 16/2033 |
| 10,591,161 B2* | 3/2020 | Super | F23N 5/187 |
| 2002/0029130 A1* | 3/2002 | Eryurek | G01F 1/363 |
| | | | 702/183 |
| 2009/0187356 A1* | 7/2009 | Artiuch | G01F 25/10 |
| | | | 702/45 |
| 2014/0083514 A1* | 3/2014 | Ding | G01F 15/046 |
| | | | 137/12 |
| 2014/0182692 A1* | 7/2014 | Hirata | G05D 7/0635 |
| | | | 137/486 |
| 2018/0340916 A1* | 11/2018 | Song | G01N 30/32 |

FOREIGN PATENT DOCUMENTS

| | | | | |
|---|---|---|---|---|
| JP | 2003149019 A | * | 5/2003 | |
| KR | 20140011267 A | * | 1/2014 | |
| WO | WO-2008079116 A1 | * | 7/2008 | F04D 15/0209 |
| WO | WO-2014181076 A1 | * | 11/2014 | G01F 1/34 |

* cited by examiner

FLUID PRESSURE MONITORING SYSTEM USING FLOW DATA

CROSS-REFERENCE

The present application claims the benefit of U.S. Prov. Appln. No. 63/165,880, filed Mar. 25, 2021, the entire contents of which are incorporated herein by reference.

FIELD

The present disclosure relates to systems for recording and monitoring fluid pressure sampled from piping systems, and more particularly relates to systems using multiple variables to monitor pressure for flow abnormalities in a piping system, such as a natural gas system.

BACKGROUND

Beginning at the well, natural gas moves into a transmission system, comprised of high-strength steel pipe. The transmission lines move large amounts of natural gas thousands of miles from the producing wells to local distribution companies (LDCs). The pressure of gas in each section of line typically ranges from 300 pounds to 1,500 pounds per square inch, depending on the type of area in which the pipeline is operating. As a safety factor, pipelines are designed and constructed to handle more pressure than is ever actually reached in the system. For example, pipelines can operate at less than one-half of their design pressure level or their Maximum Allowable Operating Pressure (MAOP).

The transmission system uses compressors to increase pressure along the pipeline. Each compressor station is located approximately every 50 miles apart along each pipeline. Most modern compressor stations are completely automated. Compressor station equipment can be operated from a remote location. The remote location is referred to as the pipeline's "system control room." The system control room monitors pressure and remotely operates safety valves along the transmission pipeline system. The pipeline operators of the system keep detailed records of operating data (including pressure) from each compressor station. Operators can continuously adjust the mix of compressors that are running in order to maximize efficiency and safety.

When the natural gas in a transmission pipeline reaches a local gas utility, it passes through a measurement take-point. These take-points are referred to as "gate stations." Utilities frequently have gate stations receiving gas at many different locations and different pipeline suppliers. Measurement gate stations serve two purposes related to pressure. First, they reduce the pressure in the line from transmission levels (300 to 1,500 pounds) to distribution levels. The distribution pressure typically operates in the range of ¼ pound to 300 pounds. Additionally, the gate station measures the volume of gas to determine the amount being received by the utility.

From the measurement gate station, natural gas moves into distribution system pipes or "mains" that range from 2 inches to more than 24 inches in diameter. Within each distribution system, there are sections that operate at different pressures. When the natural gas flows from one system to another, distribution regulator stations control the pressure.

After the natural gas moves through the distribution regulator, it travels through various size pipe diameters and lengths of pipes. The change in diameter and length causes a variance in pipeline pressures. Distribution pipeline pressures are kept within a range by operators to maintain enough pressure to safely deliver natural gas to the distribution company's customers. The minimum pressure delivered to the distribution company's customers is called service termination pressure.

Generally, the gas utility's central control center continuously monitors flow rates and pressures at distribution regulator stations and various points along the distribution network. The operators must ensure that the gas reaches each customer with enough flow rate and pressure to fuel equipment and appliances. They also ensure that the pressures stay below the maximum pressure for the monitored sections within the system.

As gas flows through the system, regulators control the flow from higher to lower pressures. If a regulator senses that the pressure has dropped below a predetermined set point it will open accordingly to allow more gas to flow. Conversely, when pressure rises above a predetermined set point, the regulator will close to adjust. Thus, it is a single point threshold system for detection and correction.

For overpressure protection, regulators are installed in series or an external relief valve installed. In series, if one pressure regulator fails the next regulator in series takes control. A "tattletale" relief valve releases natural gas to atmosphere to indicate a failure has occurred. When an external relief valve is used for overpressure protection, the relief valve is designed to release enough natural gas into the atmosphere to keep the downstream pressure at a safe level.

Based on the natural gas distribution system there are primarily three pressure monitoring areas that use pressure monitoring. These areas include using pressure monitors at compressor stations along the transmission pipelines, distribution regulator stations, and on various parts of the distribution system.

SUMMARY

According to a first aspect of the invention, a fluid monitoring system is provided. The system includes a control unit and at least one fluid pressure recorder configured for direct connection to a pipeline system to be monitored. The at least one recorder has a first pressure sensor for sensing an upstream pressure at an upstream location of a pipeline portion of the pipeline system and a second pressure sensor for sensing a downstream pressure at a downstream location of the pipeline portion. The pipeline portion at the downstream location has a known orifice size. (The orifice size may be the internal diameter of the pipeline itself or an internal diameter of a device located on the pipeline, e.g. a regulator.) The pipeline portion has known minimum and maximum pressures. (The minimum and maximum pressures may be based on a known safe range for the pipeline portion, which may be a subset of the MAOP, and may depend on regional or other variables. The minimum and maximum pressures may be expressed in PSI or another unit.) The at least one fluid pressure recorder is configured to provide the upstream pressure and the downstream pressure to the control unit. The control unit is configured to detect a condition to be monitored in the pipeline portion, even though neither the minimum nor maximum pressure is reached, if a new downstream pressure is more than a threshold number of standard deviations above or below a mean downstream pressure determined from prior readings of the downstream pressure. The condition is provided for display or can be used to trigger an action.

The control unit is preferably further configured to detect a condition if a new flow rate is more than a threshold number of standard deviations above or below a mean flow rate determined from prior readings of the upstream pressure and downstream pressure.

The control unit is preferably configured to receive and log readings from the pressure sensors over time.

The control unit is preferably configured to determine flow rates from the upstream pressure and downstream pressure readings.

The control unit is preferably configured to determine the mean downstream pressure from the downstream pressure readings.

The control unit is preferably configured to determine the mean flow rate from the determined flow rates.

At least one of the first or second pressure sensors is preferably a pressure transducer.

In some embodiments, the system may further include a temperature sensor in connection with the pipeline system and in communication with the control unit.

The temperature sensor may be configured to sense a fluid temperature in the pipeline portion. In this case, the control unit may be further configured to correct at least one of the upstream or downstream pressure according to the fluid temperature.

In the alternative or in addition, the temperature sensor may be configured to sense a temperature of a connected heating source of the pipeline system. In this case, the control unit may be further configured to detect a failure of the connected heating source. Examples of connected heating sources include: a heat tape, a transfer tape, a catalytic heater, or another heat source.

The system may further include a display unit having one or more displays.

The system may further include a communication interface to communicate the condition to a computing device.

The control unit may be further configured to detect an abnormal flow rate pattern given a pressure change. For example, the pattern may be considered abnormal if the downstream pressure has decreased in the absence of a change in the flow rate.

Preferably, the action is selected from the group consisting of: triggering an alarm, communicating a message to a computing device, controlling a regulator of the pipeline system, controlling a relief valve of the pipeline system, controlling a secondary regulator of the pipeline system, and controlling a compressor of the pipeline system.

The fluid may be natural gas. In other embodiments, the fluid may be a mixed concentration of various fluids.

According to a second aspect of the invention, a fluid monitoring system is provided for a regulator on a pipeline system. The system includes a control unit and at least one fluid pressure recorder configured for direct connection to a pipeline portion of a pipeline system to be monitored. The at least one recorder has a first pressure sensor for sensing an upstream pressure at a location on the pipeline portion upstream of the regulator and a second pressure sensor for sensing a downstream pressure at a location on the pipeline portion downstream of the regulator. The regulator has a known orifice size. The pipeline portion has known minimum and maximum pressures. The at least one fluid pressure recorder is configured to provide the upstream pressure and the downstream pressure to the control unit. The control unit is configured to detect a condition to be monitored in the pipeline portion, even though neither the minimum nor maximum pressure is reached, if a new downstream pressure is more than a threshold number of standard deviations above or below a mean downstream pressure determined from prior readings of the downstream pressure. The condition is provided for display or can be used to trigger an action.

The system is preferably further configured to detect a condition if a new flow rate is more than a threshold number of standard deviations above or below a mean flow rate determined from prior readings of the upstream pressure and downstream pressure.

According to a third aspect of the invention, a fluid monitoring system is provided. The system includes a control unit and at least one fluid pressure recorder configured for direct connection to a pipeline system to be monitored. The at least one recorder comprising a first pressure sensor for sensing an upstream pressure at an upstream location of a pipeline portion of the pipeline system and a second pressure sensor for sensing a downstream pressure at a downstream location of the pipeline portion. The pipeline portion at the downstream location has a known orifice size. The pipeline portion has known minimum and maximum pressures. The at least one fluid pressure recorder is configured to provide the upstream pressure and the downstream pressure to the control unit. The control unit is configured to detect a condition to be monitored in the pipeline portion, even though neither the minimum nor maximum pressure is reached, if a new downstream pressure-related variable is more than a threshold number of standard deviations above or below a mean of a downstream pressure-related variable determined from prior readings of the downstream pressure. For example, the downstream pressure-related variable and the new downstream pressure-related variable may be downstream pressure, or flow rate.

In broad aspects, the systems rely on trend analysis, rather than individual data points. In this way, they can be used to flag unexpected pressure and/or flow rate trends of the fluid, given mean trends and standard deviations over time. The unexpectedness may also depend on other known or detected variables, such as known or detected use patterns according to season, time of day or localized conditions. The trend is important more than an individual reading, which can be a false alarm, leading for example to unnecessary venting from a tattletale valve. Further, individual readings may fail to trigger an alarm based on maximum or minimum thresholds, but as a trend may signal a condition worth investigation, such as for maintenance before a problem occurs.

In certain embodiments, there may be multiple regulators connected in series, and the pressure recorder may be at a juncture before, between or after the individual regulators. (In certain deployments, there may be multiple recorders and more than two sensors.)

In certain embodiments, the pressure recorder may be upstream or downstream of a restriction, a compressor, or a relief valve, among other critical points.

Figure 1:
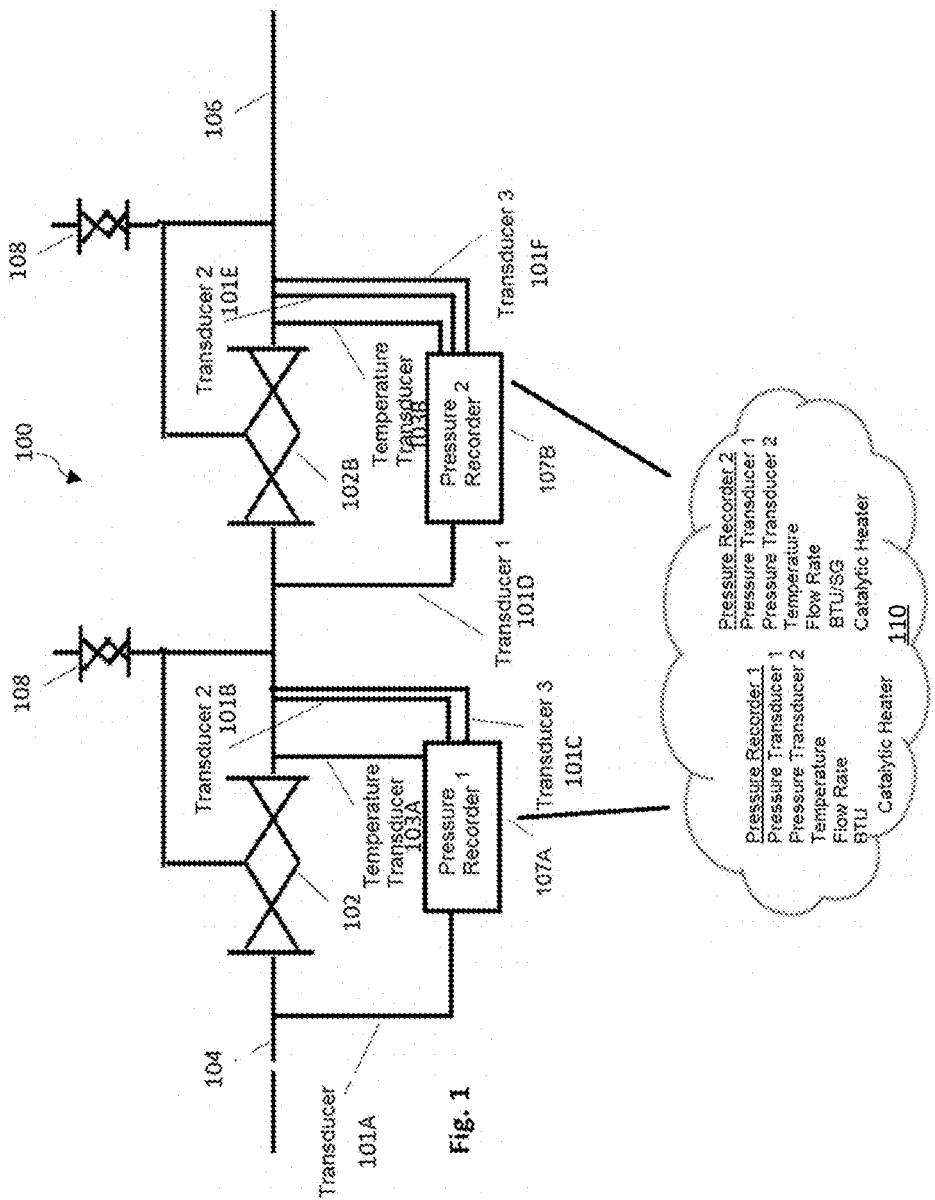
FIG. 1 is an illustration of a system for pressure recording the volume of a fluid, wherein the system uses serial overpressure protection.

The present concept is best described through certain embodiments thereof, which are described herein with reference to the accompanying drawings, wherein like reference numerals refer to like features throughout. It is to be understood that the term invention, when used herein, is intended to connote the inventive concept underlying the embodiments described below and not merely the embodiments themselves. It is to be understood further that the general inventive concept is not limited to the illustrative embodiments described below and the following descriptions should be read in such light.

DETAILED DESCRIPTION

The general inventive concepts described herein are not limited to any single context and may apply to various contexts or applications. In particular, while a natural gas context is described herein, a person of ordinary skill in the art will appreciate that other fluid distribution contexts may apply including other gases, water and oils.

Natural gas or fossil gas is an odorless naturally occurring hydrocarbon gas mixture consisting primarily of methane, but can include varying amounts of other higher alkanes, and sometimes a small percentage of carbon dioxide, nitrogen, hydrogen sulfide, or helium. Natural gas is used as a source of energy for heating, cooking, electricity generation, fuel for vehicles, as well as other processes in various industries.

A pressure measuring apparatus measures the pressure, and calculates the flow, of natural gas and may come in the form of a pressure recorder.

A pressure recorder is a precision measuring instrument that is manufactured to record various pressures. As natural gas flows through regulators, control valves, and pipes, variances in pressure can change with variances of flow rates. A pressure recorder can determine the changes in pressure relative to flow rate.

The pressure being recorded by the recorder can fluctuate depending on the amount the fluid flowing within the system.

Pressure recording can be used as a reliable and efficient means for determining the safe operating pressure of the system.

To accurately record and monitor the pressure of a single concentration of a particular fluid or a mixed concentration of various fluids through a regulator station the following parameters are used: inlet pressure of the regulator, flow coefficient of the regulator, and the universal gas regulator sizing constant 1.29. The flow rate is calculated in cubic feet per hour ($f^3$/h), calculated from the following Equation 1:

$$Q = \sqrt{\frac{520}{GT}} C_g P_{1abs} \text{SIN}\left(\frac{3417}{C_1}\sqrt{\frac{\Delta P}{P_{1abs}}}\right) DEG \quad (1)$$

Where:
Q=gas flow rate, SCFH
$P_{1abs}$=absolute inlet pressure, psia ($P_1$ gauge+14.7)
$C_g$=regulating or wide-open gas sizing coefficient
G=specific gravity of the gas
T=absolute temperature of gas at inlet, °Rankine
$C_1$=flow coefficient ($C_g/C_v$)
ΔP=pressure drop across the regulator, psi An example of the equation in Equation 1 is:
Q=gas flow rate, SCFH
$P_{1abs}$=314.7 psia
$C_g$=680
G=0.54
T=520
$C_1$=35
ΔP=160 psi
Solving for "Q":

$$Q = \sqrt{\frac{520}{(520 x 0.54)}} \times 680 \times 314.5 \times \left[\sin\frac{3417}{35} \times \sqrt{\left(\frac{160}{314.7}\right)}\right]$$

$$Q = 1.361 \times 680 \times 314.7 \times 0.937$$

Thus, Q=272,726 SCFH. This can also be expressed in cubic meters per hour ($m^3$/h).

In addition, solving the above equation for "G" (Specific Gravity) the heating value (BTU, Joules, etc) can be calculated.

An example of solving for "G" is:
Q=163,065 SCFH
$P_{1abs}$=314.7 Asia
$C_g$=680
G=Specific Gravity
T=520
$C_1$=35 ΔP=160 psi
Solving for "G" the answer is "0.54"

Figure 6:
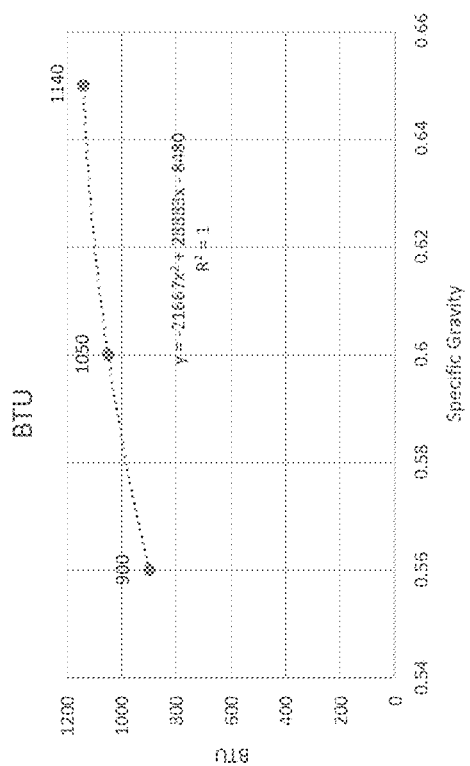
FIG. 6 is a sample graph showing conversion of specific gravity to energy units.

The specific gravity can then be converted to energy units by use of a lookup table or equation. For example, as shown in the graph in FIG. 6, if the equation: $y=-21667x^2+28883x-8480$ is used with the specific gravity of "0.54" the BTU content is calculated to be 799.

To accurately record and monitor the pressure of a fluid through a pipe within the distribution system, pressure samples are turned into other data points. Fluid pressure samples will determine the mean pressure. From these, standard deviations in the fluid pressure will be calculated. The mean and standard deviation will be calculated in pounds per square inch (PSI). The following Equations 2, 3, 4 are used to calculate mean, variance and standard deviation, respectively:

$$\text{Mean} = \frac{\text{Sum of Pressures}}{\text{Number of Pressure Readings}} \quad (2)$$

$$\text{Variance} = \frac{\text{Sum of the}\begin{pmatrix}\text{Difference between Mean and}\\ \text{each Actual Pressure Reading}\end{pmatrix}^2}{\text{Number of Pressure Readings}} \quad (3)$$

$$\text{Standard Deviation} = \sqrt{\text{Variance}} \quad (4)$$

For example, given a set point on a regulator of 160 psig. Fifteen sample pressures readings $P_i$, i=1 to 15, are taken: 164, 163, 162, 161, 160, 160, 159, 158, 157, 155, 155, 155, 155, 159, 162. The mean is the $\Sigma_{i=1}^{15} P_i/15=159$.

The variance is: $\Sigma_{i=1}^{15}(P_i-159)^2/159$ or $$(164-159)^2=(5)^2=25$$

$$(163-159)^2=(4)^2=16$$

$(162-159)^2=(3)^2=9$ $(161-159)^2=(2)^2=4$ $(160-159)^2=(1)^2=1$ $(160-159)^2=(1)^2=1$ $(159-159)^2=(0)^2=0$ $(158-159)^2=(-1)^2=1$ $(157-159)^2=(-2)^2=4$ $(155-159)^2=(-4)^2=16$ $(155-159)^2=(-4)^2=16$ $(155-159)^2=(-4)^2=16$ $(155-159)^2=(-4)^2=16$ $(159-159)^2=(0)^2=0$ $(162-159)^2=(3)^2=9$ $25+16+9+4+1+1+0+1+4+16+16+16+16+0+9=134$

Variance=134/15

Variance=8.9

Standard Deviation=$\sqrt{8.9}$

Standard Deviation=2.98 . . . =~3

To accurately record temperature, in an embodiment, a sensor (e.g. temperature transducer) is used on the piping to determine the temperature of the gas. The equation of Charles Law is used to calculate the corrected flow of gas through the regulator/s or piping system in an embodiment.

The Charles Law equation is calculated using the following Equation 5:

$$V_o = V(520/(T+460)) \quad (5)$$

Where:

$V_o$=Corrected Volume

V=Uncorrected Volume

520=Absolute Zero @ 60° F.

(Temperature drop from base temperature of 60° F. to Absolute Zero)

T=Gas Temperature (in ° F.)

460=Absolute Zero (in ° F.)

(All temperatures expressed in absolute values.)

Example

V=100 CFH

T=30° F.

$V_o$=100 [520/490]=100×1.0612=106 CFH

Temperature can also be used to monitor the use of various heating elements on a regulator station. By monitoring the temperature of heat tape, transfer tape, catalytic heaters, etc. the operators can be notified of a failure of these devices.

FIG. 1 shows an illustration of a fluid pressure recorder/monitoring system according to an example. In this type of configuration, serial overpressure protection is provided. The system 100 uses at least two pressure recorders 107A and 107B. First pressure recorder 107A receives pressure at a first position from first pressure transducer 101A and at a second position from second pressure transducer 101B and at a third position from third pressure transducer 101C. Likewise, second pressure recorder 107B receives pressure at a first position from first pressure transducer 101D and at a second position from second pressure transducer 101E and at a third position from third pressure transducer 101F. Temperature data is received from temperature transducers 103A, 103B, which are used to determine the corrected flow of gas recorded at each pressure regulator 102A, 102B. Temperature data may also include readings from connected heating sources, such as heat tape, transfer tape, catalytic heaters, etc., and failures of such devices may also be recorded for use with trend analysis and to indicate for general maintenance. These two pressure recordings can then be used determine flow rate, inlet and outlet pressure, mean outlet pressure, and standard deviation outlet pressure as the fluid flows between 104 and 106 in the pipeline. In the event of an overpressure, the system can failover from the first regulator to the second. As shown, recorder data can be communicated to cloud 110 or other network storage for retrieval and further processing or analysis.

Figure 2:
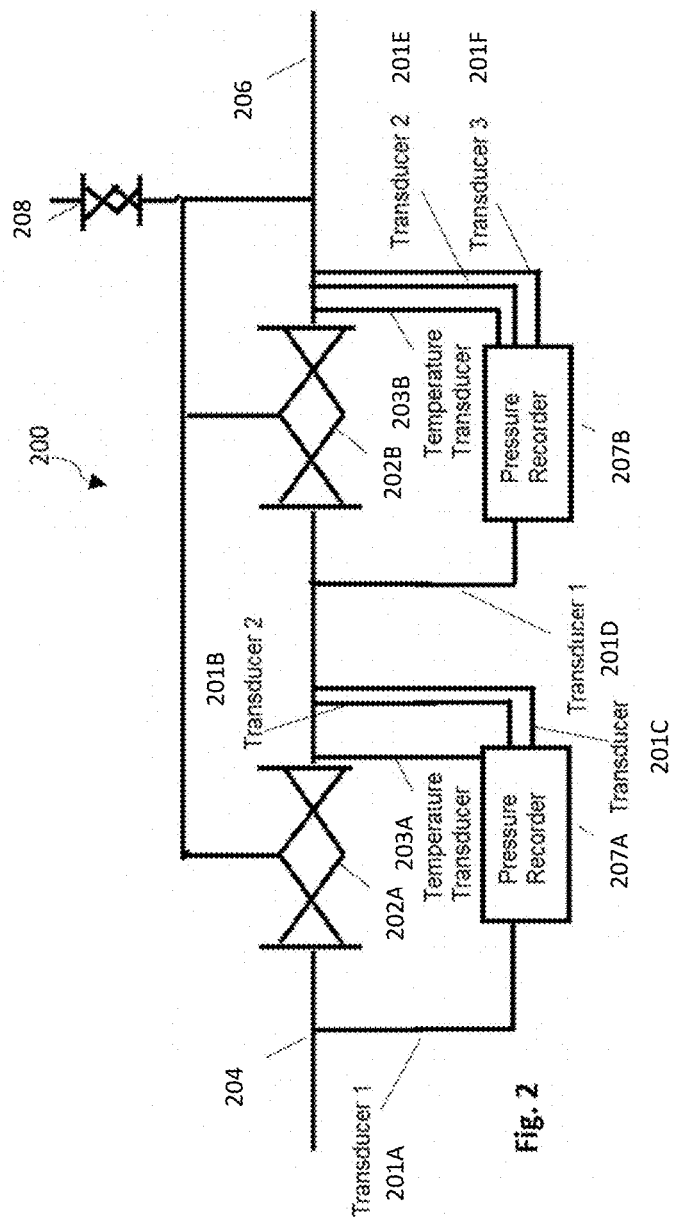
FIG. 2 is an illustration of a system for pressure recording the volume of a fluid, wherein the system uses monitored overpressure protection.

FIG. 2 shows an illustration of a fluid pressure recorder/monitoring system according to an example. In this type of configuration, monitored overpressure protection is provided. The system 200 comprises at least two pressure recorders 207A and 207B. First pressure recorder 207A receives pressure at a first position from first pressure transducer 201A and at a second position from second pressure transducer 201B and at a third position from third pressure transducer 201C. Likewise, second pressure recorder 207B receives pressure at a first position from first pressure transducer 201D and at a second position from second pressure transducer 201E and at a third position from third pressure transducer 201F. Temperature data is received from temperature transducers 203A, 203B, which is used to determine the corrected flow of gas. These two pressure recordings can then be used to determine flow rate, inlet and outlet pressure, mean outlet pressure, and standard deviation outlet pressure as the fluid flows between 204 and 206 in the pipeline. The system is monitored generally for overpressure and various corrective steps can be taken with respect to regulators 202A, 202B.

Figure 3:
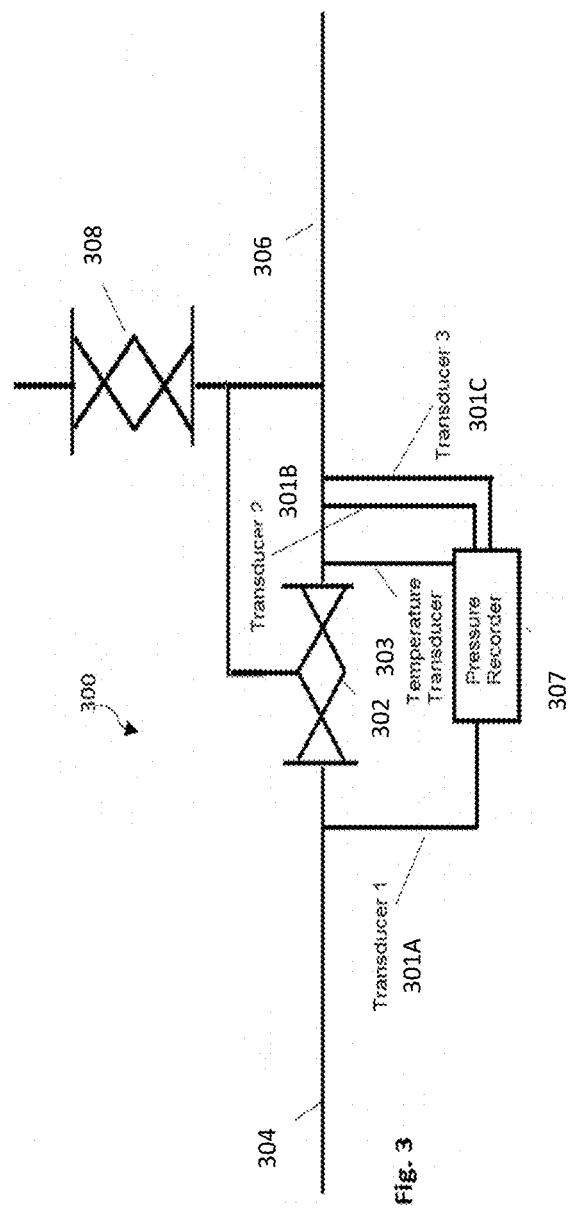
FIG. 3 is an illustration of a system for pressure recording the volume of a fluid, wherein the system uses relief valve overpressure protection.

FIG. 3 shows an illustration of a fluid pressure recorder/monitoring system according to an example. In this type of configuration, relief valve overpressure protection is provided. The system 300 comprises at least one pressure recorder 307A. First pressure recorder 307 receives pressure at a first position from first pressure transducer 301A and at a second position from second pressure transducer 301B and at a third position from third pressure transducer 301C. The pressure recorder will record flow rate, inlet and outlet pressure, mean outlet pressure, and standard deviation outlet pressure as the fluid flows between 304 and 306 in the pipeline. In the event of an overpressure, a relief valve can be triggered.

Figure 4:
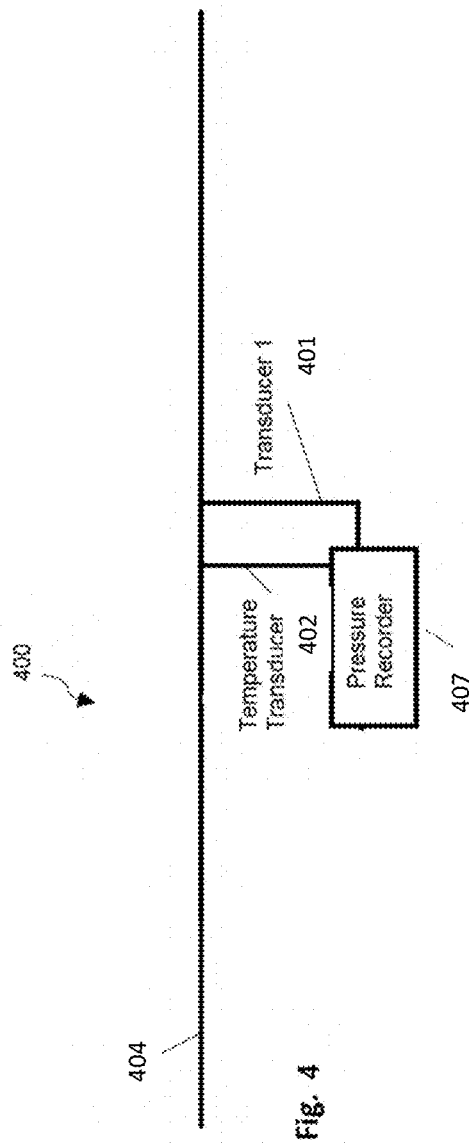
FIG. 4 is an illustration of a system for pressure recording on a piping system, wherein the system has no regulators and/or overpressure protection.

FIG. 4 shows an illustration of a fluid pressure recorder/monitoring system according to an example. In this type of very simple configuration on a piping system, there are no regulators and no overpressure protection. The system 400 comprises at least one pressure recorder 407. First pressure recorder 407 receives pressure at a first position from first pressure transducer 401. Temperature data is received from temperature transducer 402, which is used to determine the corrected flow of gas. The pressure recorder will record outlet pressure, mean outlet pressure, and standard deviation outlet pressure as the fluid flows along at 404 in the pipeline.

In the present system, pressure, temperature, flow rate, mean pressure, and standard deviation are all preferably being continuously recorded and monitored. By monitoring and recording multiple variables, condition-based monitoring and maintenance can be employed without waiting for a maximum or minimum pressure threshold to be reached otherwise triggering an alarm condition. Trend analysis is employed to determine and flag unexpected conditions. For example, if the pressure decreases and the flow rate increases, the decrease in pressure is normal. Conversely, if the pressure decreases and there is no change in flow this indicates a situation might exist that warrants investigating. In addition, the information monitored and recorded can be transmitted to a remote monitoring station.

On distribution regulator stations the pressure recorder will monitor and record pressure before and after each regulator and temperature after the regulator then calculate the flow rate through the regulator. If the outlet pressure of the regulator changes, there should be a corresponding change in the flow rate. If the outlet pressure of the regulators changes and there is no corresponding change in flow rate a problem is indicated and the distribution regulator station's operator will be notified. This allows the operator to perform maintenance before a failure occurs.

On various points of the distribution system piping, the pressure recorder will monitor and record pressure on the distribution piping. Samples of pressure will be recorded, and the mean pressure and standard deviation will be determined. If the pipeline pressure changes within a predetermined number of standard deviations the operator of the distribution pipeline will be notified. This allows the operator to perform maintenance before a failure occurs.

Figure 5:
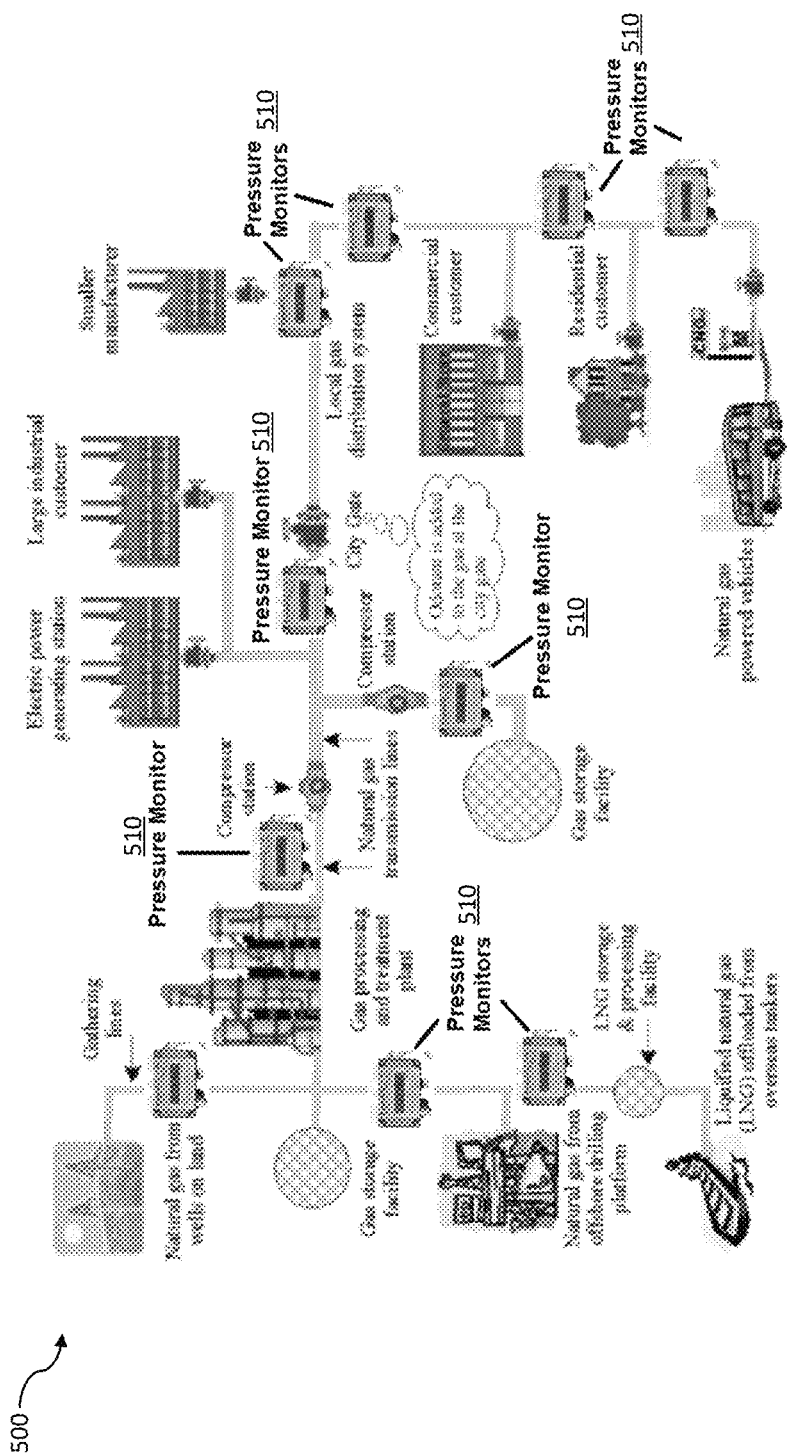
FIG. 5 is an illustration of possible positions for pressure recorder/monitors within a gas distribution system.

FIG. 5 illustrates examples of possible locations for pressure recorders or monitors 510 within such a distribution system 500. As illustrated, the recorders 510 (which may be configured as shown in any of FIGS. 1-4) may be located at transitional locations, such as: between extraction and storage or processing facilities; before and after treatment plants, compressor stations, city gates, local distribution companies; and in transit to industrial, commercial or residential customers.

Preferably, the pressure recorders communicate with a control unit. Calculations on the pressure and flow data may be carried out on a continuous basis, at intervals, or request triggered through the control unit. Frequency of sampling and calculating can be increased on detection in the system of a threshold event.

The control unit is preferably in communication with one or more display units. All of the various devices herein (pressure recorders, transducers, and display units) comprise respective communication components and may communicate via one or more protocols as is known. The networks may include a public network such as the Internet. Control unit, by way of example, may be provided as a cloud-based service, which may be configured as a service (SaaS) model.

It will be understood that control unit comprises a computing device having various components coupled for communication including at least some of: processor(s) (e.g. CPU, GPU, etc.), storage device(s), one or more communication subsystems or devices, display(s), input device(s), output device(s), etc. Displays may be touch or gesture enabled. Input devices may include a pointing device such as a mouse, a microphone, a camera, a keyboard, button(s), etc. Communication devices may couple to a location device such as to provide satellite based location services. Output devices may include a speaker, lights, vibration/haptic devices. The various components may be coupled via one or more communication buses or other structures.

The storage devices may store instructions and data for example, which instructions when executed configure the operation of the computing device. The instructions may define an operating system, applications, etc. The computing device for the control unit may be configured as a server or other device configuration.

Any of the processing units may be computing devices such as described. Other computing devices (e.g. other processing unit types) may be used such as programmable logic devices, which may be field programmable such as field programmable gate array (FPGA), etc.

Pressure data communicated from the/each pressure recorder may be raw pressure data, or the data may be preprocessed (e.g. corrected using temperature data).

Control unit that receives pressure data may then output as output data to one or more display units, for instance, in the form of a chart or graph or dashboard. In some embodiments, the output includes pressures or flow rates over a given time period. Further thresholds may be set and alerts may be activated when those thresholds are surpassed. Standardized messages may be triggered depending on threshold. Alerts may be directed to separate devices than the display units. For example, illuminated or auditory signals may be triggered on devices other than standard I/O devices. Further, thresholds may be used to control other actuators (e.g. opening or closing regulators, relief valves or compressors, or actuating secondary regulators in a series). Thresholds may be preset or they may be user-configurable and/or configurable based on averages already detected.

In addition to computing device aspects, a person of ordinary skill will understand that computer program product aspects are disclosed, where instructions are stored in a non-transitory storage device (e.g. a memory, CD-ROM, DVD-ROM, disc, etc.) to configure a computing device to perform any of the method steps, act as modules of the system, or provide other aspects of the invention described herein.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise", "include" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of the features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

What is claimed is:

1. A fluid monitoring system, comprising:
a control unit; and
at least one fluid pressure recorder configured for direct connection to a pipeline system to be monitored, the at least one recorder comprising a first pressure sensor for sensing an upstream pressure at an upstream location of a pipeline portion of the pipeline system and a second pressure sensor for sensing a downstream pressure at a downstream location of the pipeline portion, the pipeline portion at the downstream location having a known orifice size, the pipeline portion having known minimum and maximum pressures, and the at least one fluid pressure recorder configured to provide the upstream pressure and the downstream pressure to the control unit;
wherein the control unit is configured to:
determine a mean downstream pressure from a plurality of prior readings of downstream pressure of the second pressure sensor;
receive a new downstream pressure from the fluid pressure recorder;
detect a condition to be monitored in the pipeline portion, even though neither the minimum nor maximum pressure is reached, if the new downstream pressure is more than a threshold number of standard deviations above or below the mean downstream pressure; and
provide the condition for display or use to trigger an action.

2. The system of claim 1, wherein the control unit is further configured to determine a mean flow rate from flow rates determined from the plurality of prior readings of the upstream pressure and downstream pressure and detect a condition if a new flow rate is more than a threshold number of standard deviations above or below the mean flow rate.

3. The system of claim 1, wherein the control unit is further configured to receive and log readings from the pressure sensors over time.

4. The system of claim 3, wherein the control unit is further configured to determine flow rates from the upstream pressure and downstream pressure readings.

5. The system of claim 1, wherein at least one of the first or second pressure sensors is a pressure transducer.

6. The system of claim 1, further comprising a temperature sensor in connection with the pipeline system and in communication with the control unit.

7. The system of claim 6, wherein the temperature sensor is configured to sense a fluid temperature in the pipeline portion.

8. The system of claim 7, wherein the control unit is further configured to correct at least one of the upstream or downstream pressure according to the fluid temperature.

9. The system of claim 6, wherein the temperature sensor is configured to sense a temperature of a connected heating source of the pipeline system.

10. The system of claim 9, wherein the control unit is further configured to detect a failure of the connected heating source.

11. The system of claim 9, wherein the connected heating source is selected from the group consisting of: a heat tape, a transfer tape, a catalytic heater, and another heat source.

12. The system of claim 1, further comprising a display unit having one or more displays.

13. The system of claim 1, further comprising a communication interface to communicate the condition to a computing device.

14. The system of claim 1, wherein the control unit is further configured to detect an abnormal flow rate pattern given a pressure change.

15. The system of claim 14, wherein the pattern is abnormal if the downstream pressure has decreased in the absence of a change in the flow rate.

16. The system of claim 1, wherein the action is selected from the group consisting of:
triggering an alarm;
communicating a message to a computing device;
controlling a regulator of the pipeline system;
controlling a relief valve of the pipeline system;
controlling a secondary regulator of the pipeline system; and
controlling a compressor of the pipeline system.

17. The system of claim 1, wherein the fluid is natural gas.

18. The system of claim 1, wherein the fluid is a mixed concentration of various fluids.

19. The system of claim 1, wherein the plurality of prior readings comprises 15 prior readings.

20. A fluid monitoring system for a regulator on a pipeline system, comprising:
a control unit; and
at least one fluid pressure recorder configured for direct connection to a pipeline portion of the pipeline system to be monitored, the at least one recorder comprising a first pressure sensor for sensing an upstream pressure at a location on the pipeline portion upstream of the regulator and a second pressure sensor for sensing a downstream pressure at a location on the pipeline portion downstream of the regulator, the regulator having a known orifice size, the pipeline portion having known minimum and maximum pressures, and the at least one fluid pressure recorder configured to provide the upstream pressure and the downstream pressure to the control unit;
wherein the control unit is configured to:
determine a mean downstream pressure from a plurality of prior readings of downstream pressure of the second pressure sensor;
receive a new downstream pressure from the fluid pressure recorder;
detect a condition to be monitored in the pipeline portion, even though neither the minimum nor maximum pressure is reached, if the new downstream pressure is more than a threshold number of standard deviations above or below the mean downstream pressure; and
provide the condition for display or use to trigger an action.

21. The system of claim 20, wherein the control unit is further configured to determine a mean flow rate from flow rates determined from the plurality of prior readings of the upstream pressure and downstream pressure and detect a condition if a new flow rate is more than a threshold number of standard deviations above or below the mean flow rate.

22. The system of claim 20, wherein the plurality of prior readings comprises 15 prior readings.

23. A fluid monitoring system, comprising:
a control unit; and
at least one fluid pressure recorder configured for direct connection to a pipeline system to be monitored, the at least one recorder comprising a first pressure sensor for sensing an upstream pressure at an upstream location of a pipeline portion of the pipeline system and a second pressure sensor for sensing a downstream pressure at a downstream location of the pipeline portion, the pipeline portion at the downstream location having a known orifice size, the pipeline portion having known minimum and maximum pressures, and the at least one fluid pressure recorder configured to provide the upstream pressure and the downstream pressure to the control unit;
- wherein the control unit is configured to:
    - determine a mean of a downstream pressure-related variable from a plurality of prior readings of downstream pressure of the second pressure sensor;
    - receive a new downstream pressure-related variable from the fluid pressure recorder;
    - detect a condition to be monitored in the pipeline portion, even though neither the minimum nor maximum pressure is reached, if the new downstream pressure-related variable is more than a threshold number of standard deviations above or below the mean of a downstream pressure-related variable.

24. The system of claim 23, wherein the downstream pressure-related variable and the new downstream pressure-related variable are selected from the group consisting of: downstream pressure, and flow rate.

* * * * *